United States Patent
King, V et al.

(10) Patent No.: US 11,902,383 B2
(45) Date of Patent: Feb. 13, 2024

(54) ADAPTIVE MEDIA CONTENT DELIVERY NETWORK

(71) Applicant: Subspace Inc., Seattle, WA (US)

(72) Inventors: William Emmett King, V, Seattle, WA (US); Bayan William Towfiq, Seattle, WA (US)

(73) Assignee: Neoatomic LLC, Las Vegas, NV (US)

( * ) Notice: Subject to any disclaimer, the term of this patent is extended or adjusted under 35 U.S.C. 154(b) by 377 days.

(21) Appl. No.: 16/692,473

(22) Filed: Nov. 22, 2019

(65) Prior Publication Data

US 2020/0169613 A1 May 28, 2020

Related U.S. Application Data

(60) Provisional application No. 62/771,378, filed on Nov. 26, 2018.

(51) Int. Cl.
*H04L 67/148* (2022.01)
*H04L 67/563* (2022.01)

(52) U.S. Cl.
CPC .......... *H04L 67/148* (2013.01); *H04L 67/563* (2022.05)

(58) Field of Classification Search
CPC .......................... H04L 67/148; H04L 67/2814
USPC ......................................................... 709/242
See application file for complete search history.

(56) References Cited

U.S. PATENT DOCUMENTS

| | | | | |
|---|---|---|---|---|
| 7,797,426 | B1* | 9/2010 | Lyon | H04L 67/32 709/226 |
| 8,706,906 | B2* | 4/2014 | Hoynowski | H04L 45/00 709/238 |
| 9,137,300 | B1* | 9/2015 | Marshall | H04L 65/612 |
| 10,205,663 | B1* | 2/2019 | Jones | H04L 45/745 |
| 2011/0055316 | A1* | 3/2011 | Van Der Merwe | H04L 1/08 709/245 |
| 2011/0145437 | A1* | 6/2011 | Niven-Jenkins | H04L 67/2814 709/238 |
| 2011/0153719 | A1* | 6/2011 | Santoro | H04L 67/1008 709/203 |
| 2012/0215915 | A1* | 8/2012 | Sakata | H04L 67/1001 709/224 |
| 2016/0352838 | A1* | 12/2016 | Larkin | H04L 45/243 |
| 2018/0063705 | A1* | 3/2018 | Maslak | H04W 72/0433 |
| 2019/0098343 | A1* | 3/2019 | Knecht | H04N 21/2393 |
| 2019/0132281 | A1* | 5/2019 | Sawyer | H04L 47/122 |
| 2022/0286424 | A1* | 9/2022 | Majkowski | H04L 61/5007 |

* cited by examiner

*Primary Examiner* — Nicholas R Taylor
*Assistant Examiner* — Chong G Kim
(74) *Attorney, Agent, or Firm* — Rowan TELS LLC

(57) ABSTRACT

A method including sending a media content to a target media destination through a first server and receiving a first response to the media content through a second server, where the first server is the intended receiver of the first response. A resulting triggering event is followed by the generating of a request to determine how to handle the triggering event. The request is received through a network routing control that comprises logic to generate a second response to the request. Next, the second response to the request is executed.

11 Claims, 13 Drawing Sheets

ADAPTIVE MEDIA CONTENT DELIVERY NETWORK

CROSS-REFERENCE TO RELATED APPLICATIONS

This application claims priority and benefit under 35 USC 119(e) to U.S. provisional application No. 62/771,378, filed on Nov. 26, 2018, the contents of which are incorporated herein by reference in their entirety.

BACKGROUND

IP Anycast is becoming more popular for delivering media content in content delivery networks due to its adaptability and resistance to certain types of denial of service attacks.

One drawback of using IP Anycast becomes evident during longer communication sessions or for communication applications that are intolerant of disruptions, such as the communication of real-time media content. "Real-time media content" refers to audio, video, interactive teleconference data, interactive online gaming, and other digital content communicated over a network between an upstream media source and a target media destination and which requires accurate delivery to the target media destination in accordance with a timebase such that the experience or interactivity of the content is not compromised at the target media destination.

The longer a communication session goes on, the more probable it becomes that the network topology will change during the session, for example disrupting the routing connection to an IP Anycast-enabled point-of-presence (POP) acting as a relay server. "Point-of-presence" refers to an interface point between endpoint and originator devices and a network such as the Internet. An Internet point-of-presence (PoP) provides a local access point through an Internet service provider (ISP). A PoP typically comprises servers, routers, network switches, multiplexers, and other network interface equipment, and is often located in a data center. ISPs typically provide multiple PoPs to their customers. A relay server is an example of a media content routing endpoint that is not a target of the media content. If the routing to a certain point-of-presence is disrupted, IP Anycast should route packets directed to the disrupted point-of-presence to the next closest and available point-of-presence in the IP Anycast network.

An upstream media source providing media content to a target media destination through an IP Anycast network may not be informed that the media content has been rerouted through a different point-of-presence, unless/until the new destination address is propagated through the network, which may take considerable time. The communication of real-time media content using IP Anycast may thus suffer from techniques that respond to routing changes by propagating new relay server addresses throughout the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
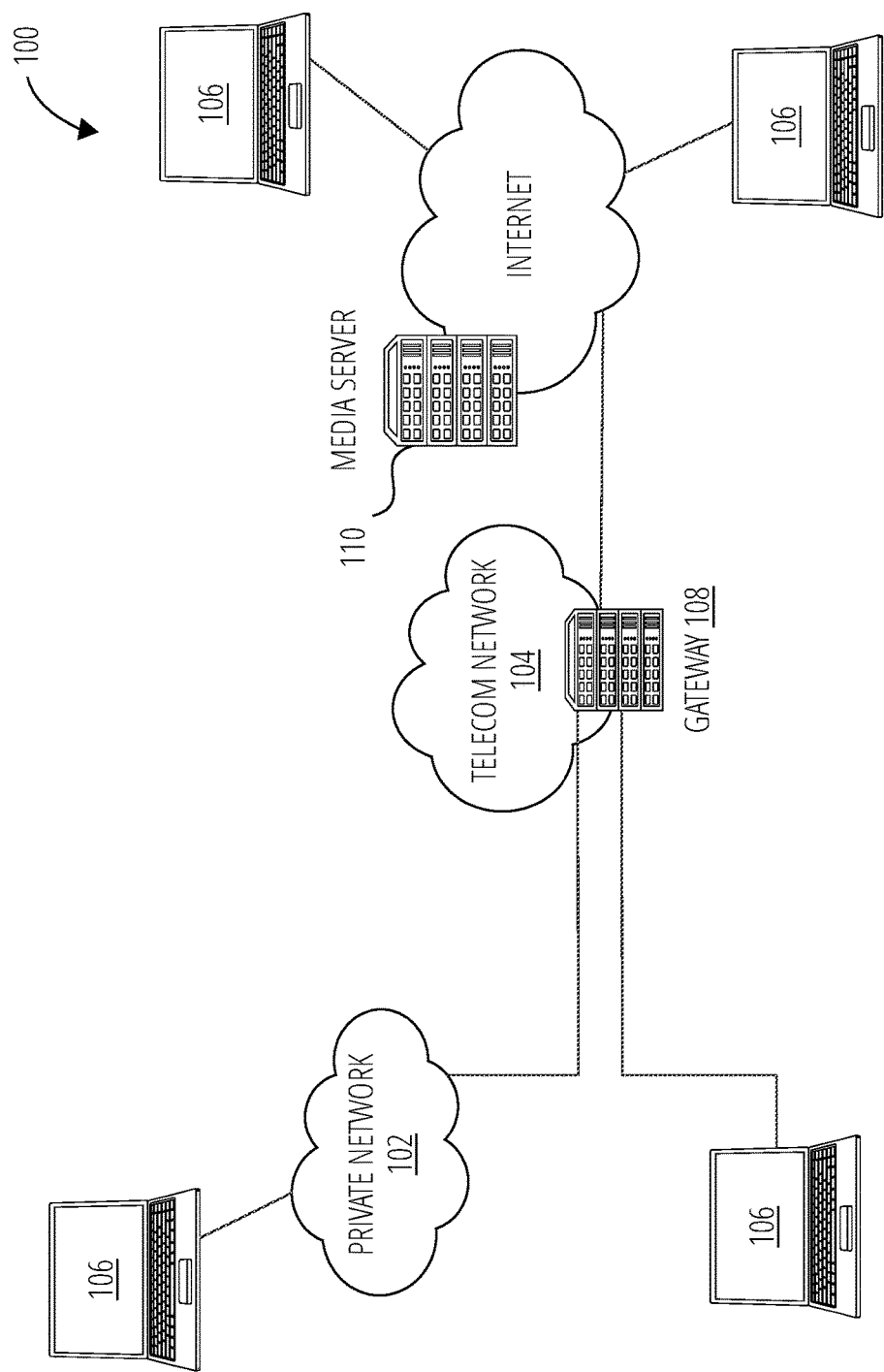
FIG. 1 depicts a network architecture 100 in accordance with one embodiment.

Certain terms used in this disclosure should be understood as follows.

"Media content" refers to any digital data. "IP Anycast" refers to a network addressing and routing technology in which a single destination address has multiple routing paths to two or more endpoints. Network routers select the routing path on the basis of factors such as number of hops, distance, lowest cost, and latency measurements, or based on the least congested route. IP Anycast addressing is a one-to-one-of-many association whereby datagrams are routed to any single endpoint of a group of potential endpoints that are all identified by the same destination address. The IP Anycast routing algorithm selects the single endpoint from the group based on least-expensive routing metrics.

"Datagram" refers to a basic transfer unit in a packet-switched network. Each datagram has two components, a header and a data payload. The header contains information for routing the datagram from the originator device to the endpoint device. Headers may include originator and endpoint addresses as well as a type field. The payload is the data to be transported.

"Originator" refers to a device originating a datagram on a network. "Packet" refers to a unit of communication over packet-switched networks, comprising control information and data known as the payload. Control information controls delivery of the payload. Examples include originator and endpoint network addresses, error detection codes, and sequencing information. Typically, control information is found in packet headers and trailers. Large packets may comprise multiple datagrams.

"Endpoint" refers to a receiver device referenced by the destination address in a data packet. An endpoint is not necessarily the final destination of a packet. For example an endpoint may be the target media destination of the packet or an intermediate network component such as a network router, relay server, switch, or other device that alters the destination address in the packet to a next hop address or to the target media destination address.

"Relay server" refers to an endpoint device in a network that receives packets and forwards the packets to a next hop (node, e.g., another server) in the network or to a target device. A relay server may in some cases alter the destination address in the packet header. The term 'relay server' is not used here in the narrow sense of a mail relay.

"Target" refers to the intended final recipient/consumer of a packet from an originator. The target is distinguished from an endpoint generally in that an endpoint may be an intermediate destination through which a packet is routed in a network, vs being the target or final intended destination of the packet. "Target media destination" refers to the target specified by an upstream media source for receipt of media content. "Upstream media source" refers to the originator of media content on a network.

Content delivery networks (CDNs) provide an example use case for IP Anycast. CDNs use short-lived and/or stateless communication connections to deliver large volumes of small, static content (e.g., web pages). In this scenario it is a reasonable assumption that the network routing will remain static for at least the length of a session. If the network routing changes during a session there is minimal impact on the user experience, such as the need to reload a webpage if a session fails in the middle of loading it with a browser application. The assumption of short communication sessions does not extend to network applications involving extended experience of real-time media content such as interactive gaming or video and audio conferencing.

Network routing changes may result in potentially long disruptions in communication sessions that can degrade or destroy a user's experience of real-time media content. The systems and techniques disclosed herein detect anomalies in the routing of packets and respond by rerouting the packet and subsequent packets between an originator and a target in a manner that eliminates or mitigates disruptions of the user experience. This is especially useful during real-time media content communication over data networks.

Telecommunication service providers ("telecoms") typically provide multiple point-of-presence locations to users of their network. These point-of-presence locations are typically implemented in different geographic locations. At any given time a telecom may not have complete or accurate information regarding the network route to a target media destination to which to route communications from an originator. The disclosed techniques and systems provide improvements to the user experience of media content communicated over telecom networks in such scenarios.

IP Anycast implementations include an inherent synchronization limitation. The synchronization limitation arises, for example, when a network server in an IP Anycast environment communicates a packet to an endpoint (e.g., a target), the endpoint responds with a response packet, and the response packet is routed (via IP Anycast) to any of multiple servers that share the same IP Anycast destination address. The server sending the packet isn't configured with advance settings as to which of the multiple servers the response packet will be routed via IP Anycast. This can cause two problems: the server sending the packet may time out the communication session because it doesn't receive a response, and the server receiving the response packet may interpret the packet as unauthorized (e.g., spam or an intrusion).

For example if server A in an IP Anycast network sends a packet to a target device indicating that the device needs to start ringing, and the target device responds with an acknowledgement packet, a server B in the IP Anycast network may receive the acknowledgement packet instead of server A. Server B may generally not have sufficient information about the network state to properly interpret and handle the response packet. This is due to the fact that it has traditionally been challenging to synchronize servers across different locations that are geographically dispersed, e.g., different point-of-presence locations, because of the potentially massive amounts of data, and hence bandwidth, that are required.

In order to form a single "virtual" server from many geographically separate physical servers (e.g., in an IP Anycast network), each of the individual servers needs information about the workload and other activities of all of the others, to share network state, network routing application state, etc. "Network routing application" refers to a network routing control implemented as application logic. "Network routing control" refers to logic disposed in a network to provide monitoring and control of routing behavior in the network overall or a subset of the nodes in the network. Network latency issues may make it impractical to share network state and network routing application state across all of the servers in a timely and efficient manner. Additionally, traditional networks utilize proprietary applications and control the routing of transmissions over private networks, while operating to minimize the amount of traffic sent over the public Internet.

Network latency may impact the user's experience of communicated real-time media content. As an example, the desired response time for updating items like network or server state is typically less than about 80 milliseconds. A round trip time globally on a fiber network half way around the world is typically 200 milliseconds or more. A delay of this magnitude may be noticed by an end user, such as one making a call using session initiation protocol (SIP), due to a degradation in call quality.

The techniques disclosed herein enable multiple servers that are geographically dispersed to coordinate so as to present as a single "virtual" server to originator and target devices. These devices need not alter their existing (legacy) networking logic to use the virtual server thus presented. A change of configuration settings may suffice. For example, an originator or target device may utilize conventional SIP or Web Real-Time Communication (WebRTC) applications for sending and receiving real-time media content over the virtual server formed by the multiple geographically dispersed individual servers.

The techniques disclosed herein do not rely on consistency of state across the network. A level of network consistency may be tuned based on geography. For example, servers in California, USA, may require notification of changes in network state or network routing application state in a timely manner, but a server in Paris, France, may not require such notifications. The server in Paris may be too far away to be effectively utilized in a real-time media content communication path between originator and target devices in the vicinity of California. If there is incomplete consistency across the network, there is a possibility that a packet may be received by a server that is not configured to respond to it. As a default, many servers will drop that type of packet as Internet spam. The disclosed techniques address this scenario.

In one embodiment the disclosed techniques respond to anomalous network traffic to route communications at the application layer. "Application layer" refers to logic in a networking application that performs user interactions and high-level communication functions. These can include identifying communication partners, determining resource availability, and synchronizing communication with other networking applications. Upon detecting anomalous traffic being directed to a server, the system may initiate a determination of the state of the anomalous traffic from other machines of the network. For example, the server may react in two different ways. First, the server may retrieve state information from other, geographically nearby servers and take over the task of relaying the media content associated with the anomalous packet. The geographically nearby servers may be determined in manners known in the art, such as by using proximity maps, routing tables, latency pings, and so on.

This may be enabled by syncing the network state, at least locally, and reconfiguring the server receiving the anomalous packet to take over as the relay of the associated media content. A second type of response may be to instruct the requesting server that the receiving server incorrectly received the response or request packet for the media content. "Request" refers to a signal requesting that the receiver respond in some way. The incorrect server may request the original media content and may issue a request to a network routing control to be configured as the relay server of record for the media content. Thus, for a defined IP address domain on the Internet, the server that was previously an incorrect recipient of an unexpected packet is made the default intermediary for routing the associated media content.

The disclosed techniques improve and make more efficient the routing and flow of network traffic. For example, if there are 256 IP addresses that are being advertised from discrete server locations of a virtual server simultaneously in an IP Anycast network, and a session is initiated from location A, then location A by default may initiate with 0.1 IP addresses, location B may initiate with 0.2 IP addresses, and location C may initiate with 0.3 IP addresses, even though all of them may receive all of the IP addresses. If location B receives a packet directed to the 0.1 IP address, it identifies that address with a location A transmission to handle by default, and the packet may be routed to location A by the location B server. This may eliminate the need to do a broadcast lookup request to all of the closest server neighbors to determine the correct server for the received packet. The last digit of the IP address may be applied to uniquely identify which location should be the master of this data.

FIG. 1 depicts a network architecture 100 in accordance with one embodiment. The network architecture 100 in this example includes sub-networks comprising a private network 102, telecom network 104, and the Internet. A number of user devices 106 communicate with one another using the network architecture 100, for example to engage in interactive online gaming or voice/video conferencing. Any of the user devices 106 may act as an originator and/or target of media content. In a typical scenario one of the sub-networks within the overall network architecture 100 comprises a media server 110 (usually more than one) to coordinate the distribution of the media content among the user devices 106. Each of the sub-networks typically includes many other well known components that are not depicted for simplicity of illustration. These components include routers, hubs, switches, storage systems, and the like. "Switch" refers to a device that filters and forwards packets between network segments. Switches operate at the data link layer (layer 2) and sometimes the networking layer (layer 3) of the OSI Reference Model and therefore support any packet protocol.

Networks that use switches to join segments are called switched networks. "Hub" refers to a common connection point at junctions in a network. For example hubs connect different segments of a network at multiple ports so that when a packet arrives at one port, it is copied to the other ports so that all segments of the network carry all packets. "Router" refers to a device utilized to forward packets between at least two networks, for example between a private network and the Internet or the Internet and a telecom network. Routers are located at gateways, the devices where two or more networks connect. Routers use headers and forwarding tables to determine the best path for forwarding the packets between networks, and they use protocols to communicate with each other and configure the best route between endpoint devices on the networks. The sub-networks may be interfaced to one another using components such as a gateway 108.

"Networking layer" refers to logic utilized in networked devices providing the functional and procedural mechanisms to communicate packets from one network device to another, wherein each network device is typically associated with a network address, although not necessarily uniquely so. The networking layer may implement message delivery by splitting large messages into many packets or datagrams at one node, sending the fragments independently, and reassembling the fragments at another node. It may, but does not need to, report delivery errors. The networking layer is referred to as "Layer 3" in some implementations. In the depicted example the telecom network 104 will typically utilize many gateways each providing a point-of-presence to the Internet or another network. The gateway 108 typically functions as a router, which directs packets that arrive at the gateway 108, and as a switch, furnishing the actual path in and out of the gateway 108 for packets.

The private network 102 and the Internet in this example may operate as IP Unicast networks, whereas the telecom network 104 may operate as an IP Anycast network. "IP Unicast" refers to a network addressing and routing technology in which a single destination address is uniquely associated with an endpoint. IP Unicast addressing uses a one-to-one association between an originator and an endpoint: each destination address uniquely identifies a single endpoint.

Figure 2:
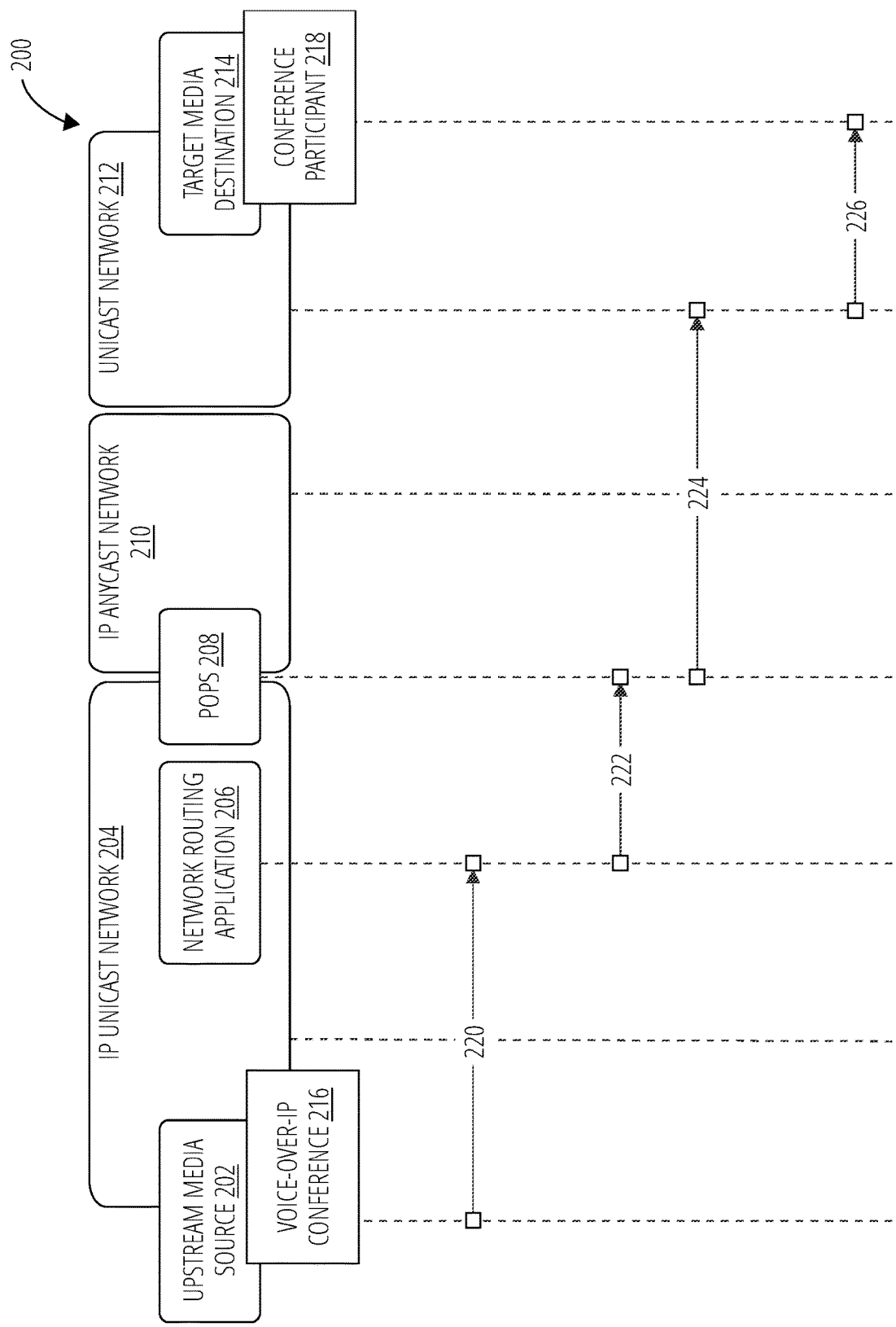
FIG. 2 depicts a media content transmission process 200 in accordance with one embodiment.

FIG. 2 illustrates media content transmission process 200 in accordance with one embodiment. An upstream media source 202, such as a voice-over-IP conference server or gaming server, acts as an originator of time-sensitive real-time media content, such as a combined audio and video stream from multiple participants of a teleconference (the server originates the combined stream, not individual streams from user devices). In this scenario the upstream media source 202 intermediates between user devices in an audio/video teleconference or interactive game, for example.

The real-time media content in audio/video teleconferences is time-sensitive in the sense that should a portion of the data be lost due to a failure in the network, recovery cannot be made, as the delayed data is significantly reduced in usefulness; for example, media content comprising a voice-over-IP conference 216 stream will, if lost from the meeting, not be recoverable as useful data once that portion of the meeting is past.

Media content 220 may be communicated from the upstream media source 202 over an IP Unicast network 204 via a network routing application 206. This network routing application 206 may route the media content 222 to one of the points-of-presence 208 to the IP Anycast network 210.

The network routing application 206 may comprise logic to implement aspects of the techniques described herein, as will be discussed further below.

The points-of-presence 208 act as a gateway for the media content traffic between the IP Unicast network 204 and an IP Anycast network 210. The IP Anycast network 210 makes the points-of-presence 208 appear as a single virtual server with a common IP address to devices communicating over the unicast network 212. If a specific POP experiences a failure or outage media content can continue to flow between the upstream media source 202 and the target media destination 214 (e.g., a conference participant 218) using the same IP address without reconfiguration of the applications (e.g., games, conferencing applications) on these devices.

This may be accomplished by maintaining server states and networks states such that each of the points-of-presence 208 can be assigned to any of the address translations the IP Anycast network 210 will be expected to handle, in addition to an assigned set of translations a specific POP will be expected to perform. Thus each of the points-of-presence 208 may be take over translation typically handled by any other POP that happens to fail, and may be able to notify the network routing application 206 of unexpected translation requests, as discussed in more detail with regard to FIG. 3.

Figure 3:
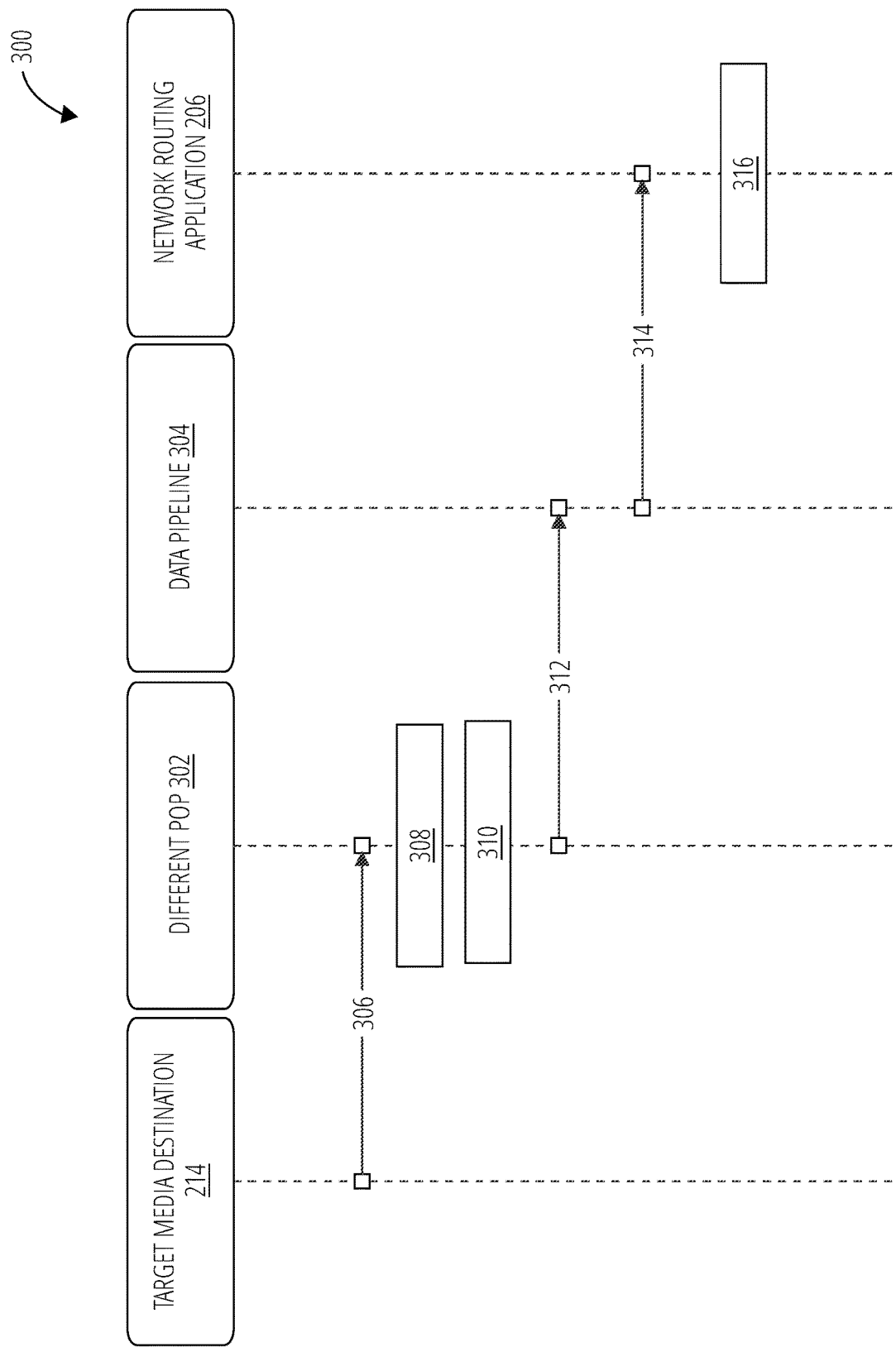
FIG. 3 depicts an alert response process 300 in accordance with one embodiment.

The media content 224 received by a POP may be communicated over the IP Anycast network 210 to a unicast network 212. From there the media content 226 may flow to the target media destination 214, such as the conference participant 218. As depicted in FIG. 3, the target media destination 214 may return an acknowledgement (ACK) to the particular one of the points-of-presence 208 that was the originator endpoint of the media content 226. "ACK" refers to a general acknowledgement of receipt message passed between components in or over a communication network.

FIG. 3 illustrates an alert response process 300 in accordance with one embodiment. A target media destination 214, such as the conference participant 218, may transmit an ACK message 306 upon receipt of the media content 226. From the perspective of the application on the target media destination 214 device, the virtual server formed by all of the points-of-presence 208 is the endpoint device for the ACK message 306. This ACK message 306 may thus be transmitted back through the unicast network 212 to the IP address shared by all of the points-of-presence 208 on the IP Anycast network 210. The point-of-presence that receives the ACK message 306 may not be the same POP that sent the media content 224. FIG. 3 depicts a scenario in which a different point-of-presence 302 from the one that sent the media content 224 receives the ACK message 306 from the conference participant 218 that received the media content 226.

The different point-of-presence 302 may be programmed to handle translation for and accept acknowledgement from a target media destination 214 that was previously serviced by another POP. This might be necessary due to a failure of the original POP. In conventional systems, only one POP may be assigned to and capable of handling address translation to and from a particular target media destination. Other POPs on the same system may be reject traffic from devices they aren't familiar with. Should the assigned POP experience a failure, data transmission to and acknowledgement from that target may be disrupted until or unless POP functionality is restored or until the network or target media destination performs a reconfiguration.

With regard to the system disclosed herein, however, each of the points-of-presence 208 is enabled with the capability of performing translation for all expected target media destinations. In the case that an unfamiliar ACK message is received 308 the different point-of-presence 302 continues the address translations and transmissions performed by the POP that originally provided the media content 224 thus preserving an uninterrupted real-time media content experience by the conference participant 218.

When the unfamiliar ACK message is received 308 it is a triggering event that initiates address translation 310 by the different point-of-presence 302. "Triggering event" refers to a signal, datagram, packet, or state that generates an alert. "Alert" refers to a signal generated in response to a preconfigured triggering event to notify machine components to initiate an action in response to the triggering event. The different point-of-presence 302 communicates a translated address and notification 312 to a data pipeline 304. The translated address and notification 312 may include various identifying information about the unexpected packet. "Identifying information" refers to IP addresses, MAC addresses, ports, and so on that may be utilized to determine a specific media source, media destination, or intermediate device or application in a communication network.

The data pipeline 304 may be a server or other network equipment providing a corrective feedback mechanism implemented locally or globally. Multiple data pipelines may be configured to manage local events on one time scale while regional and/or global data pipelines operate on a broader timescale. "Data pipeline" refers to data processing elements coupled in series, where the output of one element is the input of the next one. The elements of a pipeline are often executed in parallel or in time-sliced fashion; in that case, some amount of buffer storage is often inserted between elements. Data queues are a common example of a data pipeline.

When the data pipeline 304 receives the translated address and notification 312 from the different point-of-presence 302 it communicates the translated address and notification 314 to the network routing application 206.

The network routing application 206 may perform an internal reconfiguration 316 such as updating routing tables or mapping the IP address of the POP that provided the media content 224 to the target media destination 214 originally to the IP address of the different point-of-presence 302.

In some environments the network routing application 206 may communicate with the upstream media source 202 to alter the endpoint IP address used by upstream media source 202 to send media content to the target media destination 214. For example a voice and video conference server with this capability may be provided with the IP address of the different point-of-presence 302 by the network routing application 206 and may switch to communicating the media content to this IP address instead of the original POP that serviced the target media destination 214. Otherwise the network routing application 206 may perform this rerouting on behalf of the upstream media source 202.

Thus the network routing application 206 may reassign the upstream media source 202 to a new POP, or the network routing application 206 may update its routing tables such that the upstream media source 202 sees no change in the POP it is communicating with. In either case media content from the upstream media source 202 is streamed through the different point-of-presence 302 to the target media destination 214, and vice versa.

Figure 4:
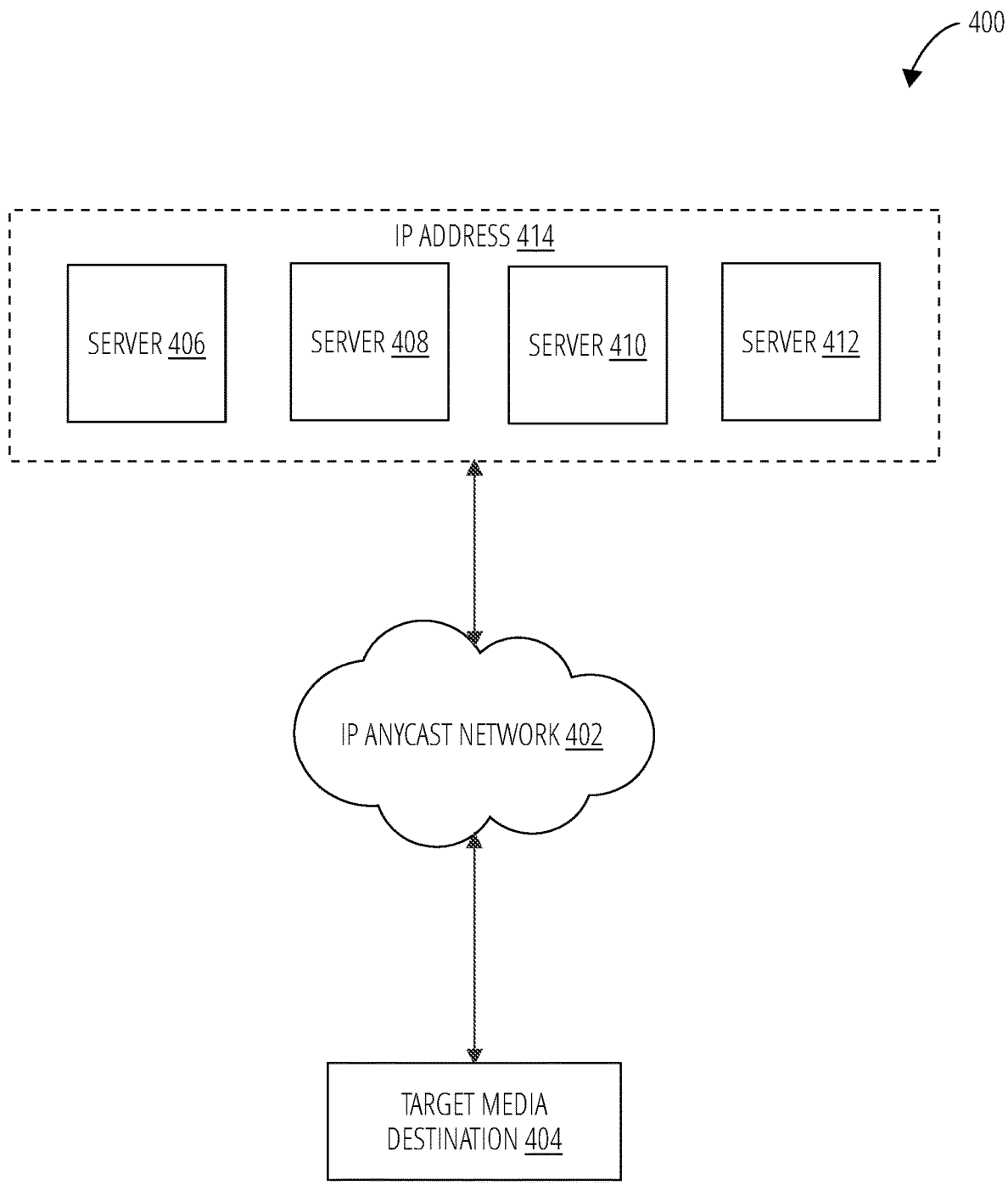
FIG. 4 depicts a server system 400 in accordance with one embodiment.

Referring to FIG. 4, a content delivery server system 400 comprises an IP Anycast network 402 that is used to deliver media content to a target media destination 404. When the target media destination 404 requests media content from the IP Anycast network 402, the IP Anycast network 402 may request the media content from a group of servers (as depicted, server 406, server 408, server 410, and server 412) sharing a same Anycast IP address 414. One or more of these servers may be initially assigned as a relay server to receive and forward the media content from an upstream media source. The servers may utilize protocols such as Transmission Control Protocol (TCP), Stream Control Transmission Protocol (SCTP), or User datagram Protocol (UDP), for example, to forward the media content downstream to the target media destination 404. "TCP" refers to a main component of the Internet protocol suite. TCP provides reliable, ordered, and error-checked delivery of packets over Internet Protocol (IP) networks.

In like fashion, the target media destination 404 may transmit media content to one or more of the servers by directing the media content to the common IP address 414 via the IP Anycast network 402.

A handshake process (e.g., TCP) may be utilized to establish a data connection between the target media destination 404 and the particular one of the servers assigned to relay the media content to the target media destination 404. When the target media destination 404 initiates the connection, the handshake begins with a SYN message from the target media destination 404 to the IP address 414. "SYN" refers to a request message from an originator to a network server or other endpoint requesting a communication session, also called a connection. SYN, ACK, and SYN-ACK are commonly used to establish connections in TCP communications. The SYN is directed by the IP Anycast network 402 to one of the servers and that server acknowledges the SYN by sending a SYN-ACK back to the target media destination 404 via the IP Anycast network 402. "SYN-ACK" refers to a response to a SYN acknowledging receipt of the SYN. The target media destination 404 may then respond to the server with an ACK message, thereby establishing the connection. For purposes of explanation, assume server 406 is the server that is assigned the connection with the target media destination 404 by the IP Anycast network 402.

In some scenarios, e.g., when the server 406 becomes unavailable, the IP Anycast network 402 may route the ACK message from the target media destination 404 to a server other than the server 406 that provided the SYN-ACK. For purposes of explanation, assume this other server is server 408. An upstream media source may continue to direct the media content to the original server 406. If the other server 408 does not properly deal with the unexpected ACK message, the target media destination 404 may experience substantial delays in the experience of the media content, particular real-time media content.

Figure 7:
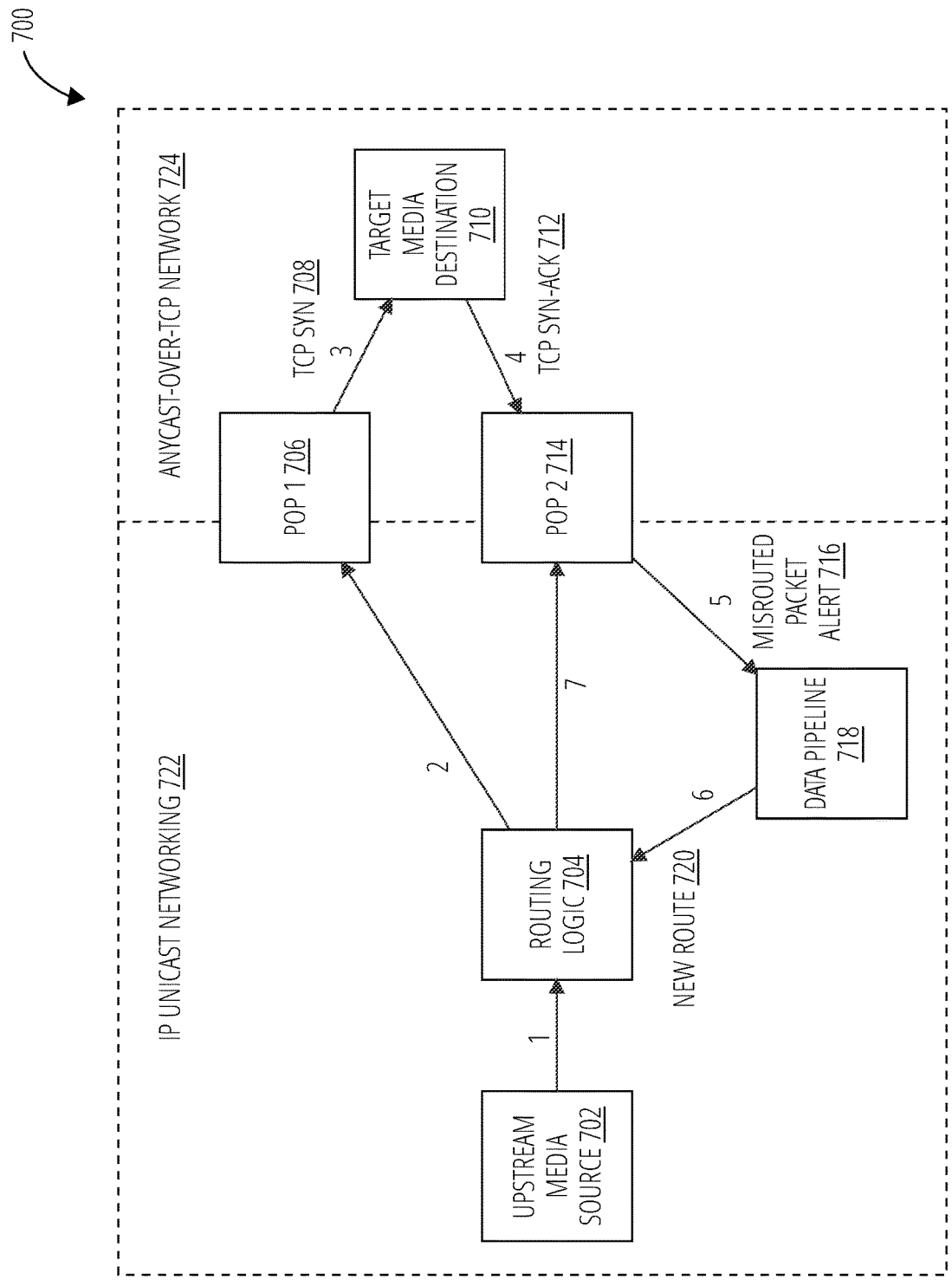
FIG. 7 depicts a point-of-presence system 700 in accordance with one embodiment.

In some cases the server may initiate the connection request with the target media destination 404. In these cases the unexpected event may be the SYN-ACK returned by the target media destination to a different server than the one that initiated the connection with a SYN message. This scenario is depicted in FIG. 7.

In either event, there are several ways to address the problem. First, the other server 408 may take over responsibility for relaying the media content to and/or from the target media destination 404 after receiving routing instructions from the original server 406. Second, a network system controller may update the network state to indicate that the other server 408 is to be the new relay server for the media content to and from the target media destination 404. "Network system controller" refers to a device or set of devices that provides overall control over security, routing, quality, and other configured behaviors of the network. The network system controller may comprise or have control over the network routing control. This may be less desirable because the new state may take some time to take effect in the IP Anycast network 402. Third, if the media content is being provided under the control of a network routing application 206, the network routing application 206 may be informed by the server 408 or a network system controller of the triggering event (e.g., wrong destination server for ACK or SYN-ACK) and operate to make the server 408 the endpoint for the media content in the IP Anycast network 402.

Figure 5:
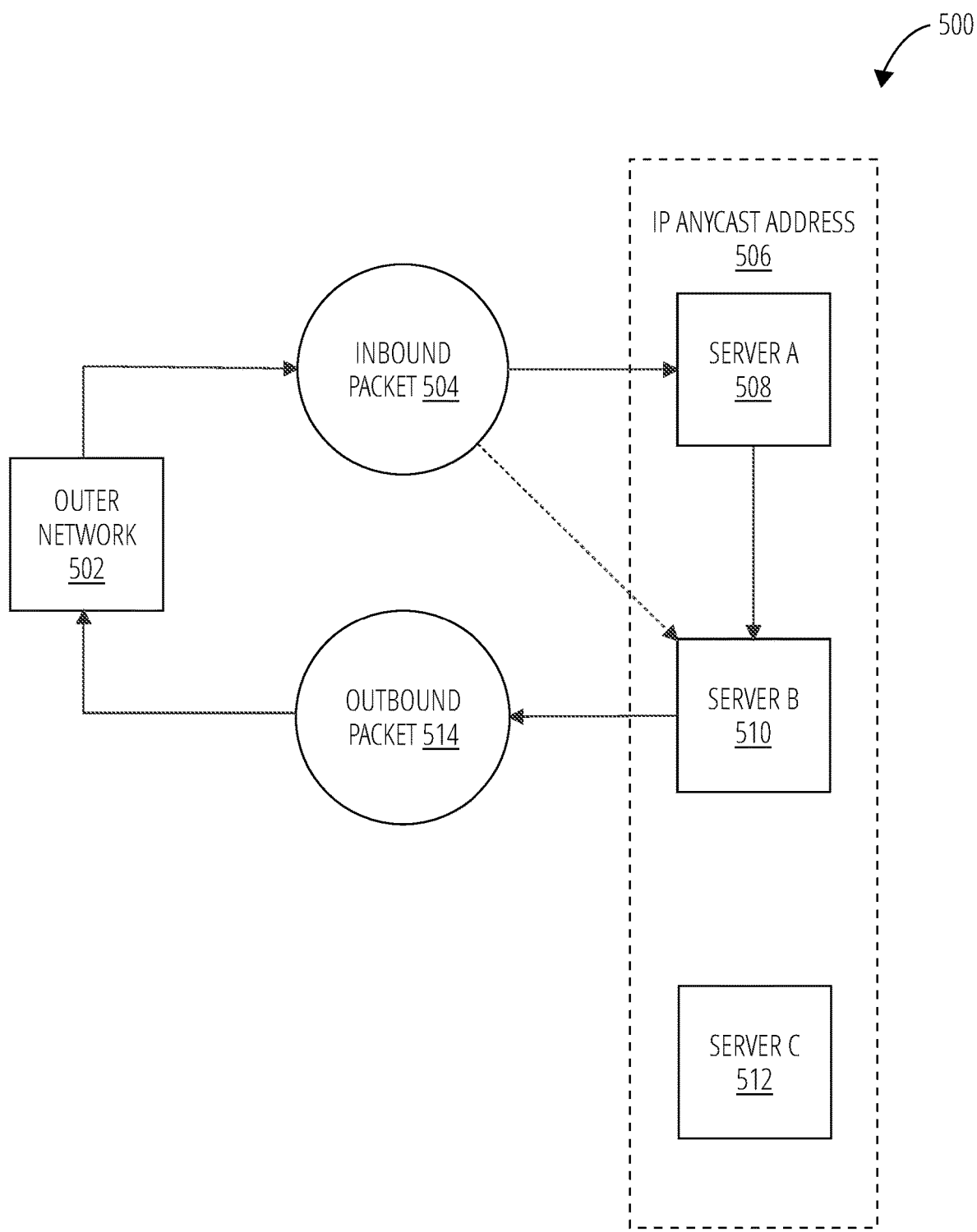
FIG. 5 depicts a server system 500 in accordance with one embodiment.

Referring to FIG. 5, a server system 500 comprises an outer network 502 and an IP Anycast address 506 that maps to a server A 508, a server B 510, and a server C 512. The outer network 502 may request media content from the IP Anycast address 506 by sending an inbound packet 504 to server B 510. Server A 508 may receive the inbound packet 504 instead of server B 510 and may route the request to server B 510. Server B 510 may send an outbound packet 514 to the outer network 502.

The outer network 502 may not be aware that server A 508 received the inbound packet 504 instead of server B 510. If the outer network 502 is not informed of the routing change of the inbound packet 504 from server A 508 to server A 508 then the outer network 502 may continue to inefficiently route requests (e.g., connection requests) for the media content to server A 508.

Figure 6:
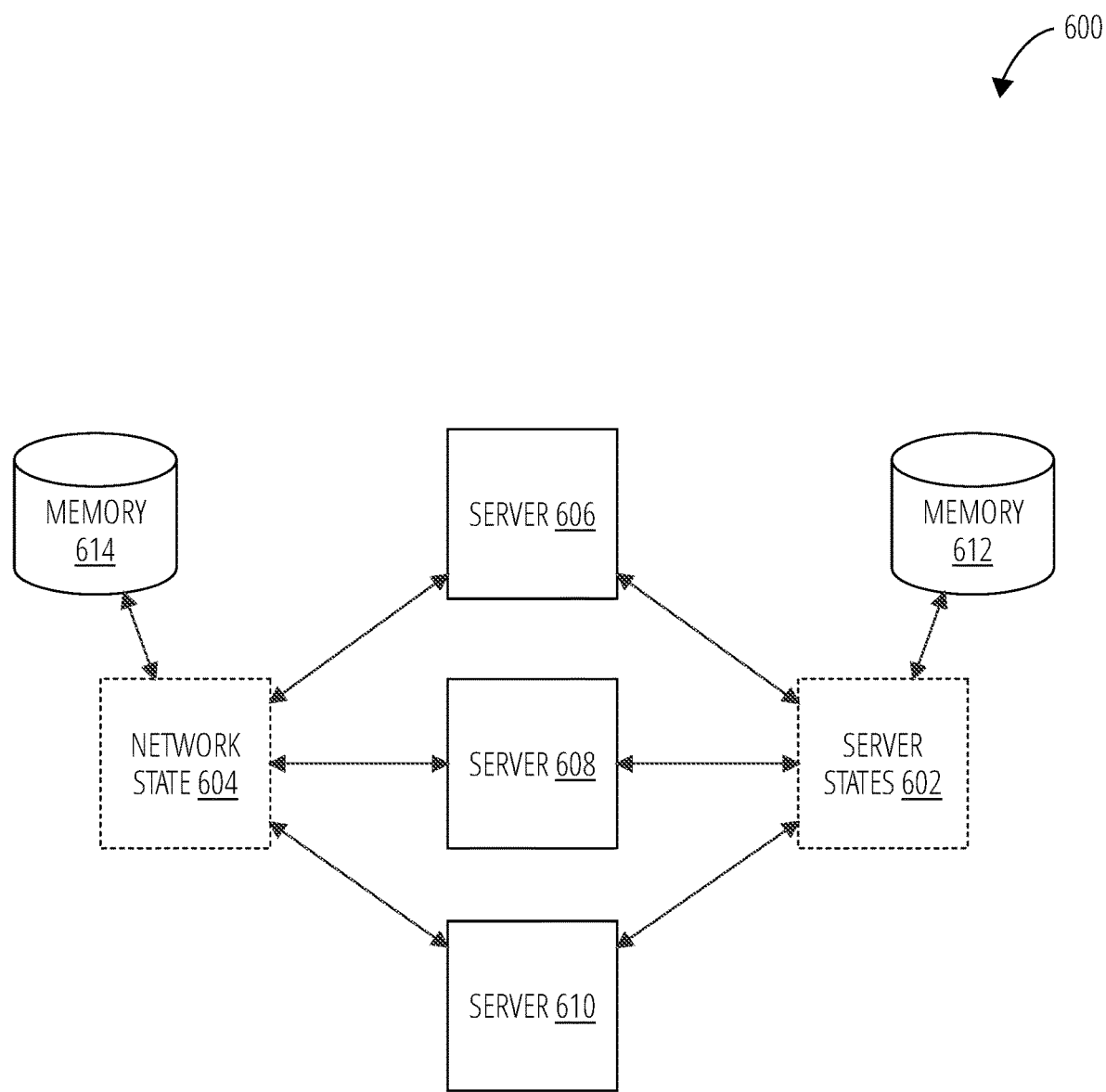
FIG. 6 depicts a server system 600 in accordance with one embodiment.

Referring to FIG. 6, a server system 600 comprises server states 602 in a memory storage 612, a network state 604 in a memory storage 614, and various servers (e.g., server 606, a server 608, and a server 610). Each server updates the memory storage 614 with the any changes to the server states 602. The server states 602 may include the amount of utilization of the capacity of each server, the data bandwidth into and out of each server, etc. Any changes to the resource utilization or availability within, into, or out of a server may result in a change in server state. For example, a state change may occur if the server 606 receives a response (e.g., ACK) from a target media destination that it was not expecting because, for instance, the response should have been sent to server 608.

If the server 606 writes a change to the server states 602 memory, then the server 608 and the server 610 may be informed of this update. Likewise, if the server 610 writes a change to the network state 604, the server 606 and the server 608 will also be informed of this update. A change in the network state 604 may be due to a change in network congestion or links experiencing high packet losses, for example. As long as each of the server 606, the server 608, and the server 610 is able to access the latest server states 602 and network state 604, the server system 600 may adapt to routing or topological changes in the network and continue to operate in an efficient manner.

Referring to FIG. 7, a point-of-presence system 700 comprises an upstream media source 702 exchanging content with a target media destination 710. The upstream media source 702 (e.g., a teleconferencing or gaming server or participant) transmits media content to routing logic 704. The routing logic 704 is disposed in an IP Unicast networking 722 environment and routes the media content to a point-of-presence 706. Upon receipt of the media content the point-of-presence 706 transmits a TCP SYN 708 message to the target media destination 710 located in an Anycast-over-TCP network 724 network environment. Each POP acts as a gateway between the IP Unicast networking 722 and the Anycast-over-TCP network 724, for example by implementing border gateway protocol. "Border gateway protocol" refers to a class of communication protocols to exchange routing and reachability information among systems on networks such as the Internet. The border gateway protocol (BGP) makes routing decisions based on paths, network policies, and/or rule-sets. In BGP, the autonomous system boundary routers (ASBR) send path vector messages to advertise the reachability of networks. Each router that receives a path vector message verifies the advertised path according to its policy. If the message complies with its policy, the router modifies its routing table and the message before sending the message to the next neighbor.

According to the TCP protocol, the target media destination 710 should respond to the TCP SYN 708 message from the point-of-presence 706 by returning a TCP SYN-ACK 712 message to the point-of-presence 706. Due to equipment failures, congestion, or other factors, the Anycast-over-TCP network 724 may direct the TCP SYN-ACK 712 to the point-of-presence 714 instead of the point-of-presence 706. Because the point-of-presence 714 was not the source of the TCP SYN 708 to the target media destination 710, the TCP SYN-ACK 712 received by the point-of-presence 714 from the target media destination 710 is treated as an unprompted SYN-ACK by the point-of-presence 714. The point-of-presence 714 responds to this triggering event by generating a misrouted packet alert 716 to the data pipeline 718. The data pipeline 718 may also be referred to as an 'event handler'. The data pipeline 718 computes and pushes a new route 720 for the media content from the upstream media source 702 to the routing logic 704, which may be a network routing application. The new route 720 from the upstream media source 702 to the target media destination 710 traverses the point-of-presence 714, not the original point-of-presence 706 that was used to route the media content to the target media destination 710.

A network system controller may comprise or interact with the routing logic 704 which may be disposed in an IP unicast network environment (e.g., on the Internet or on a private network). The media content may be routed using the routing logic 704 through a first media endpoint (e.g, a point-of-presence) to the target media destination 710. The first media endpoint may send a SYN to the target media destination 710 to request a connection, where the first media endpoint is in or a gateway to an Anycast-over-TCP network 724 network environment that includes or intermediates between the first media endpoint and the target media destination 710. The SYN is received by the target media destination 710 which acknowledges receipt of the SYN by sending a SYN-ACK to an IP Anycast address that includes the first media endpoint and the second media endpoint (e.g., a different point-of-presence than the one that sent the SYN). This results in a triggering event. In response to the triggering event, an alert is sent from the second media endpoint to a data pipeline 718, wherein the alert is for the misrouting of the SYN-ACK. A new route of the media content is pushed from the data pipeline 718 to the routing logic 704, where the new route includes the second media endpoint. Next the media content is routed from the upstream media source 202 using the new route to the second media endpoint, followed by routing the media content from the second media endpoint to the target media destination 710.

Figure 8:
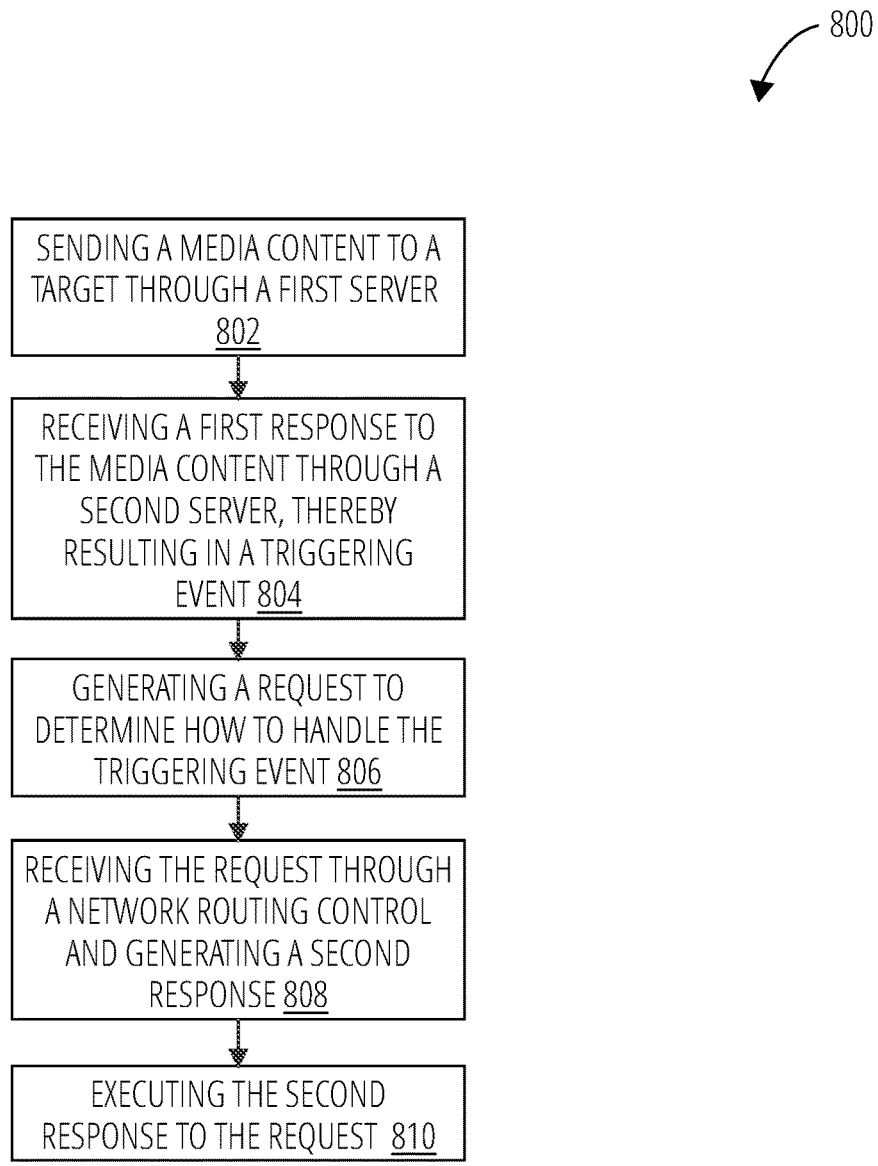
FIG. 8 depicts a media content rerouting process 800 in accordance with one embodiment.

Referring to FIG. 8, a media content rerouting process 800 comprises sending media content to a target through an IP Unicast network to a first server (block 802) that acts as a gateway to an IP Anycast network. In an embodiment, the media signal is sent through a network routing application that resides in (is comprised by) the IP Unicast network.

A first response to the media content is received at a second media server, other than the first media server, thereby initiating a triggering event (block 804). The second media server may also be a gateway between the IP Anycast network and the IP Unicast network. The first response (e.g., a SYN-ACK in response to a SYN from the first media server) is provided by the target but is directed by the IP Anycast network to the second media server instead of the first media server. The first media server and the second media server may share a common IP address in the IP Anycast network.

A request is generated by the second media server to determine how to handle the triggering event (block 806). In an embodiment, the request may be received through a network routing control in the IP Unicast environment. The network routing control may include network mapping functionality. "Network mapping functionality" refers to logic implementing a model of network behavior based on network communication and connectivity information. The network mapping functionality may comprising algorithms such as packet and traffic profiling, ping/response testing and timing, and other techniques known in the art. A second response to the request may be generated (block 808). If the media content is sent via a network routing application to the target media destination, the second response may be at least one of changing the internal mapping of a networking layer between the location of the first media server and the second media server, changing a network routing application that is assigned to route the media content, instructing the network routing application to reroute the media content through a different server, and combinations thereof. "Internal mapping" refers to a memory table or other associative structure to correlate one thing to another. The media content rerouting process 800 further comprises executing the second response to the request (block 810).

Figure 9:
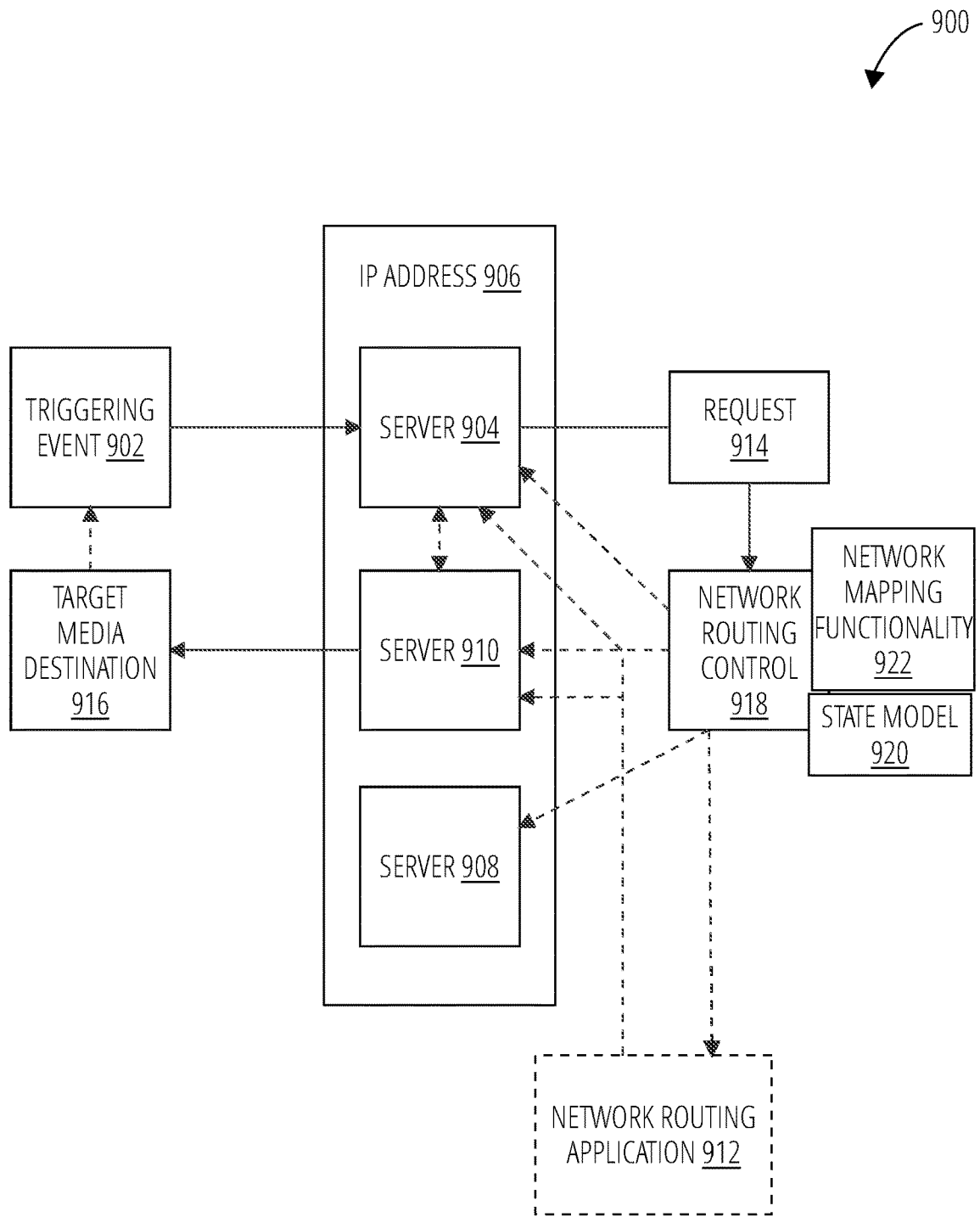
FIG. 9 depicts a server system 900 in accordance with one embodiment.

Referring to the server system 900 of FIG. 9, a triggering event 902 that may or may not originate from a target media destination 916 reaches a server 904 at an IP address 906. The dashed lines with directional arrows represent signals that may or may not occur (i.e., optional signals or routes) in response to this triggering event 902, depending on the implementation. The triggering event 902 may be any number of things, such as an incorrect packet being routed to the server 904 or a communication session that is unexpectedly interrupted at the server 904. A state request 914 is initiated by the server 904 at the IP address 906. The IP address 906 may map to all three of server 904, server 910, and server 908.

In response to the request 914, the network routing control 918 may issue instructions to each of server 904, server 910, and server 908, or to a network routing application 912. Upon receiving routing instructions, at least one of server 904, server 910, and server 908, or the network routing application 912, may route media content to a target media destination 916. One or both of network routing control 918 and network routing application 912 may be external to the IP Anycast network that comprises the IP address 906, or they may both be part of the IP Anycast network. In one embodiment each of these components resides in an IP Unicast network.

The network routing control 918 may respond to the request 914 by reading differential and spatial information from a state model 920 at a machine learning/artificial intelligence server. This server may be part of the network routing control 918 or a separate component. The network routing control 918 may utilize the retrieved information to generate and output rerouting information to at least one of server 904, server 910, and server 908.

Generally, an upstream media source may send a message (e.g., a media content packet) to a target media destination 916 over a data network. That message may initially be routed through one of the servers (e.g., server 910) to the target media destination 916. The target media destination 916 may respond to the server 904 instead of the server 910, especially if both of the server 904 and the server 910 are assigned to a common IP Anycast address. There are several ways to handle such a triggering event 902.

First, server 904 may cooperate with server 910 to ensure that the target media destination 916 receives the message. To determine that the message originated through the server 910, the server 904 may perform a lookup via network mapping functionality 922 which may be implemented in the network routing control 918. In some embodiments the network routing control 918 is a centralized or distributed network routing application 912.

If the server 910 was a relay server for the message then the server 904 may instruct the network routing control 918 to relay messages to the target media destination 916 through the server 904 instead of through the server 910. The network mapping functionality 922 may be updated with the new routing information.

There are a number of ways the server 904 may handle the triggering event 902, for example: (1) cooperating with the other servers (server 908, server 910) to handle the media content, (2) accepting responsibility for handling the media content, (3) rejecting the media content, or (4) instructing the network routing control 918 to perform a rerouting of the media content. Thus, reactions by the server 904 to the triggering event 902 may include changing the network mapping functionality 922 at the networking layer in the network mapping functionality 922, switching responsibility for routing the media content to a different network routing application 912, instructing the network routing control 918 to reroute the media content through a different relay server, and combinations thereof. The triggering event 902 and/or the reconfiguration initiated in response to the triggering event 902 may occur at the networking layer or the application layer, or both.

Packet activity and events at the networking layer may be monitored throughout the IP Anycast network and recorded to assist with decisions on how to handle anomalous packets. Monitoring may include detecting and recording the nature of anomalies, the time of such anomalies and the servers where they occur, and details from anomalous packets (e.g., addresses, settings, data payload . . . ). The network routing control 918 may utilize the network mapping functionality 922 for this purpose. The network routing control 918 may be implemented by a dedicated server or servers, or by one or more of the servers that relay media content (e.g., server 904, server 910, or server 908). As previously noted, the network routing control 918 may in some embodiments utilize or be implemented with one or more network routing application 912.

In one embodiment, the server 910 may initially receive the media content to provide to the target media destination 916. When the network routing application 912 (e.g., anomalous ACK or SYN-ACK) is received by the server 904, the server 904 may engage the network routing control 918 to instruct the server 910 to respond to the network routing application 912 event, in effect re-synchronizing the server 910 and the target media destination 916. In another embodiment, when the server 910 fails to receive the SYN-ACK or ACK, it may engage the network routing control 918 to determine if another server anomalously received the SYN-ACK or ACK and reported it to the network routing control 918.

After the triggering event 902 at the server 904 a decision may be determined to either reconfigure the network routing at the networking layer or at the application layer of a network routing application. The reconfiguration may comprise a packet rout, a packet reroute, or use of a proxy. The decision may be made available to each of server 904, server 910, and server 908.

In an embodiment, a profiling process may be undertaken in advance of the communication of real-time media content to particular target media destinations or other (e.g., intermediate) endpoints. Profiling packets may be communicated to endpoints that are suspect, or to a subset of the endpoints on the network, to determine if backscatter (i.e., bounced or incorrectly routed packets) occurs. Any server of the IP Anycast network, or the network mapping functionality 922 of the network routing control 918, may initiate this process by pinging nodes that it expects to communicate with, and if it does not receive a correct ping response from a particular node, the routing for packets of the upcoming real-time media content may be adjusted accordingly.

Figure 10:
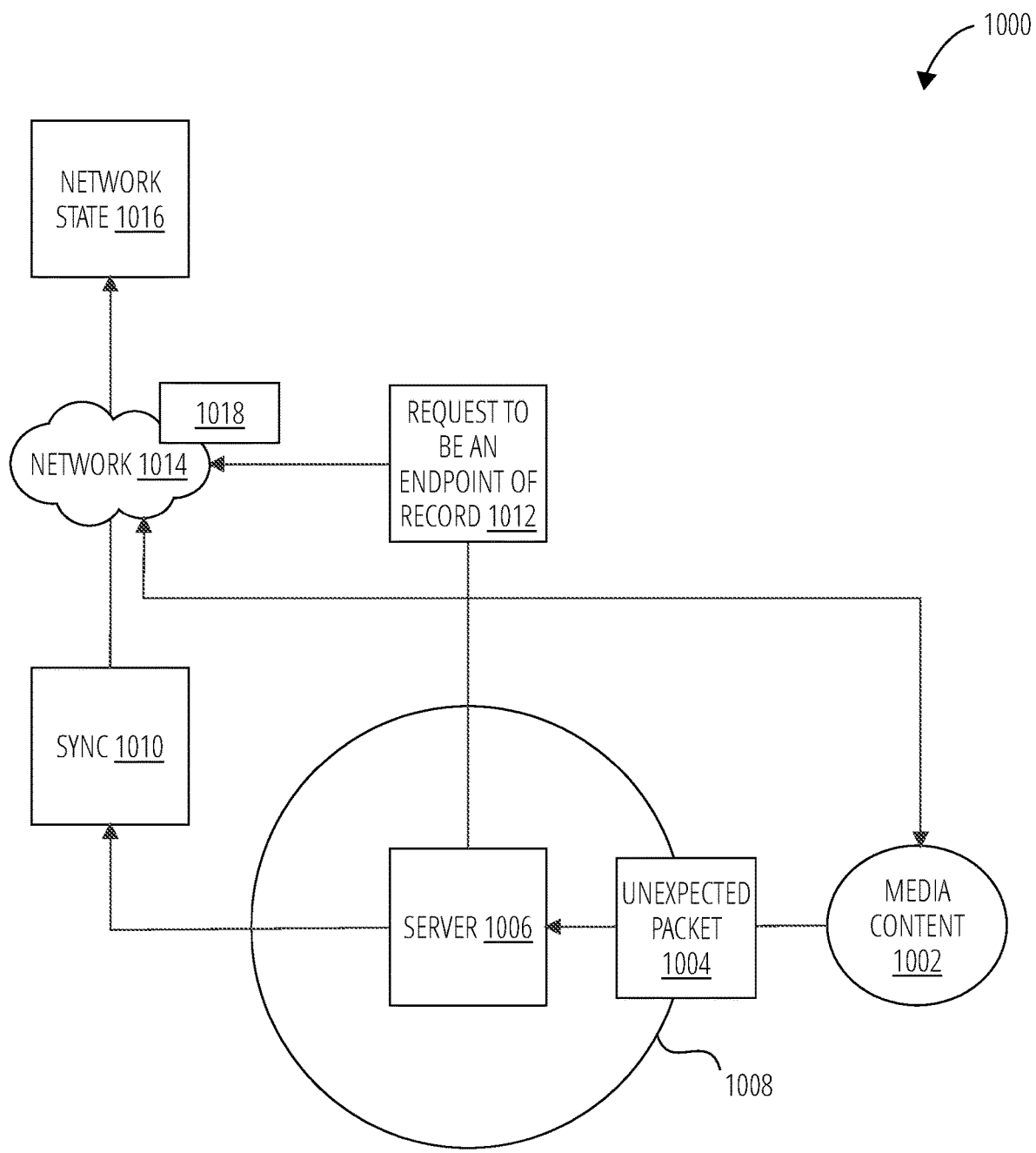
FIG. 10 depicts a server system 1000 in accordance with one embodiment.

Referring to FIG. 10, a server system 1000 comprises a point-of-presence 1008 including a server 1006 that receives an unexpected packet 1004 associated with media content 1002 directed to another server. The server 1006 may issue a request to be an endpoint of record 1012 to a network routing control 1018 of the network 1014, and may optionally sync 1010 with other servers of the network 1014. The network routing control 1018 may update the network state 1016 upon granting the request to be an endpoint of record 1012 to the server 1006.

On a conceptual level, the server system 1000 may splice into the TCP stack and/or into other communication protocol stacks such that when an unexpected packet 1004 is received, a triggering event to the network routing control 1018 is generated. An event logging system may record the triggering event and an artificial intelligence system implementing network mapping functionality may utilize and learn from the log. Denial of service protection may be implemented by applying the network mapping functionality to the network routing control 1018 to filter unexpected packets that fit the profile of attacks from ever reaching point-of-presence servers such as server 1006.

Figure 11:
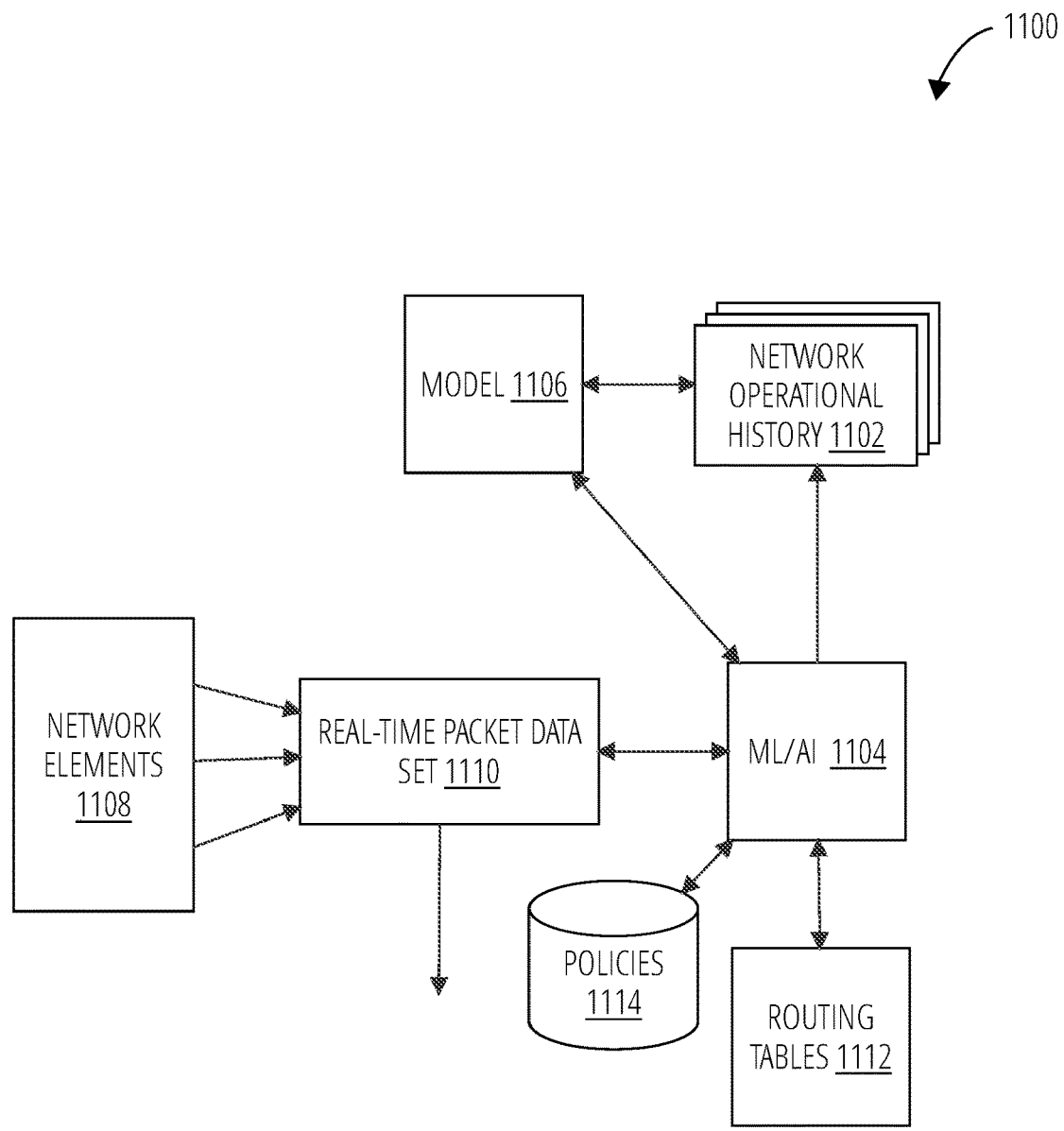
FIG. 11 depicts network mapping functionality 1100 in accordance with one embodiment.

Referring to FIG. 11, network mapping functionality 1100 operates, in this example, on a real-time packet data set 1110 from network elements 1108 (servers, routers, switches etc.) during network operation. The network mapping functionality 1100 may also or alternatively operate on recorded network operational history 1102.

The real-time packet data set 1110 is applied to a machine learning/artificial intelligence algorithm 1104 (ML/AI data stream), possibly along with the network operational history 1102, to generate a model 1106 of the network, including connectivity, routing, and performance dimensions. The machine learning/artificial intelligence algorithm 1104 uses the model 1106 to identify features of the network, such as routing weaknesses, congestion, or other patterns such as those indicating a denial of service attack. The machine learning/artificial intelligence algorithm 1104, which may be part of the network mapping functionality implemented by a network routing control, may then modify the network's routing tables 1112, and/or modify the real-time packet data set 1110 according to configured network policies 1114.

Logs of the real-time packet data set 1110 may be provided to applications such as Apache Kafka™, a distributed streaming platform, or Elasticsearch™, a distributed, Representational State Transfer (RESTful) search and analytics engine. In some embodiments, the machine learning/artificial intelligence algorithm 1104 is a subscription service. "Service" refers to a process configurable with one or more associated policies for use of the process. Services are commonly invoked on server devices by client devices, usually over a data network such as the Internet. Many instances of a service may execute as different processes, each configured with a different or the same policies, each for a different client. The machine learning/artificial intelligence algorithm 1104 may write raw data from the real-time packet data set 1110 to the network operational history 1102 and/or may write information about the model 1106. "Process" refers to software that is in the process of being executed on a device.

The model 1106 (which may be one or more models) may be provided, at least in an initial version, by a third party, with access purchased through a subscription. The real-time packet data set 1110 may be received from one source (IP address, port, gateway, aggregating network component etc.) or many different sources. The real-time packet data set 1110 may be applied to the model 1106 to determine appropriate actions in response to triggering events. The machine learning/artificial intelligence algorithm 1104 may perform batch processing computations on the real-time packet data set 1110 for improved performance and/or simultaneous generation or updating of multiple models.

The monitoring and modeling by the machine learning/artificial intelligence algorithm 1104 may be implemented on a single (e.g., dedicated) server or in a single data center. The logic for the machine learning/artificial intelligence algorithm 1104 may be distributed across the network. This real-time packet data set 1110 may be recorded continuously to the network operational history 1102 and then processed at regular time intervals. In an embodiment, after receiving the data for a certain interval of time, such as 7 days, 14 days, 21 days, etc., the real-time packet data set 1110 is processed by the machine learning/artificial intelligence algorithm 1104 using batch computations to determine how or if to update the model 1106.

The network operational history 1102 may be structured in such a manner as to implement the model 1106 or a substantial portion of the model 1106. Potential updates to the model 1106 may be tested to determine their effectiveness before being deployed broadly. The data sets used by the machine learning/artificial intelligence algorithm 1104 may represent a small interval, such as one hour, of data received at a single data center. The data sets may also be larger, such as one day across the entire platform (all data centers). A portion of the network operational history 1102 may be applied (e.g., simulated operation) to the network to compare the results to desired performance metrics and determine if an update to the model 1106 will work properly and/or will improve operations.

The model 1106 may detect whether incoming data streams meet expectations, and determined what can be validated elsewhere in the system. This use case may be implemented in an intrusion detection service used to validate real time traffic state. In conventional network operations, latency becomes an issue because network routing may require reviewing several minutes to several hours of past data to determine a previous network state. The present disclosure describes techniques for performing this analysis in real time. Intrusion detection systems may be used as an example because they are conventional services performing a similar real time evaluation.

Figure 12:
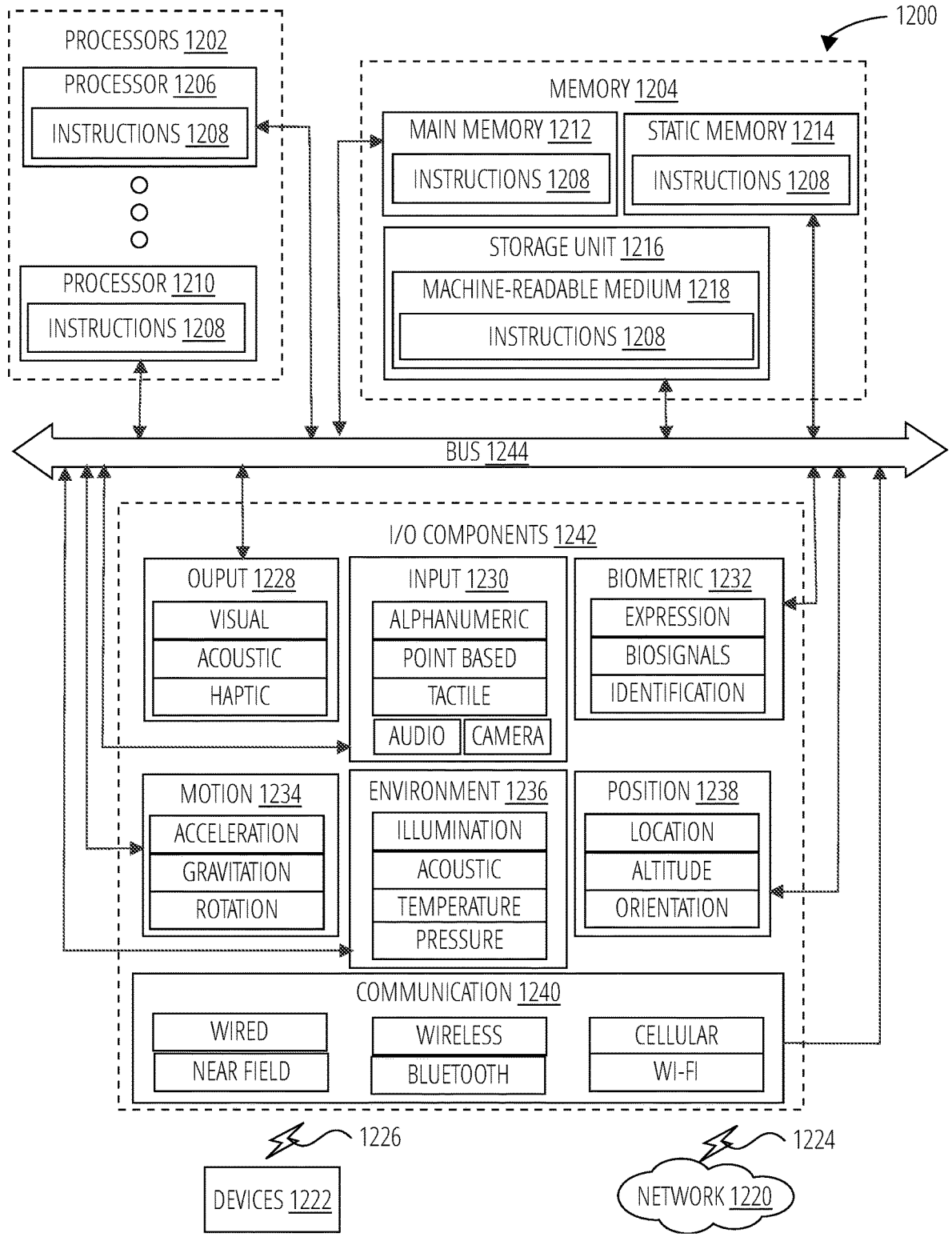
FIG. 12 depicts a machine 1200 in the form of a computer system within which a set of instructions may be executed for causing the machine to perform any one or more of the methodologies discussed herein, according to an example embodiment.

FIG. 12 depicts a diagrammatic representation of a machine 1200 in the form of a computer system within which logic may be implemented to cause the machine to perform any one or more of the functions or methods disclosed herein, according to an example embodiment. "Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

Specifically, FIG. 12 depicts a machine 1200 comprising instructions 1208 (e.g., a program, an application, an applet, an app, or other executable code) for causing the machine 1200 to perform any one or more of the functions or methods discussed herein. For example the instructions 1208 may cause the machine 1200 to carry out described aspects of the media content transmission process 200, alert response process 300, and/or functions of the network routing control and network mapping functionality. The instructions 1208 configure a general, non-programmed machine into a particular machine 1200 programmed to carry out said functions and/or methods.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is depicted, the term "machine" shall also be taken to include a collection of machines that individually or jointly execute the instructions 1208 to perform any one or more of the methodologies or subsets thereof discussed herein.

The machine 1200 may include processors 1202, memory 1204, and I/O components 1242, which may be configured to communicate with each other such as via one or more bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1206 and processor 1210) to execute the instructions 1208. The term "processor" is intended to include multi-core processors that may comprise two or more independent processors (sometimes referred to as "cores") that may execute instructions contemporaneously. Although FIG. 12 depicts multiple processors 1202, the machine 1200 may include a single processor with a single core, a single processor with multiple cores (e.g., a multi-core processor), multiple processors with a single core, multiple processors with multiples cores, or any combination thereof.

The memory 1204 may include one or more of a main memory 1212, a static memory 1214, and a storage unit 1216, each accessible to the processors 1202 such as via the bus 1244. The main memory 1212, the static memory 1214, and storage unit 1216 may be utilized, individually or in combination, to store the instructions 1208 embodying any one or more of the functionality described herein. The instructions 1208 may reside, completely or partially, within the main memory 1212, within the static memory 1214, within a machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones will likely include a touch input device or other such input mechanisms, while a headless server machine will likely not include such a touch input device. It will be appreciated that the I/O components 1242 may include many other components that are not shown in FIG. 12. The I/O components 1242 are grouped according to functionality merely for simplifying the following discussion and the grouping is in no way limiting. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1242 may include biometric components 1232, motion components 1234, environmental components 1236, or position components 1238, among a wide array of possibilities. For example, the biometric components 1232 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth.

The environmental components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 may include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (i.e., memory 1204, main memory 1212, static memory 1214, and/or memory of the processors 1202) and/or storage unit 1216 may store one or more sets of instructions and data structures (e.g., software) embodying or utilized by any one or more of the methodologies or functions described herein. These instructions (e.g., the instructions 1208), when executed by processors 1202, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

In various example embodiments, one or more portions of the network 1220 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1220 or a portion of the network 1220 may include a wireless or cellular network, and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1208 and/or data generated by or received and processed by the instructions 1208 may be transmitted or received over the network 1220 using a transmission medium via a network interface device (e.g., a network interface component included in the communication components 1240) and utilizing any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1208 for execution by the machine 1200, and/or data generated by execution of the instructions 1208, and/or data to be operated on during execution of the instructions 1208, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Figure 13:
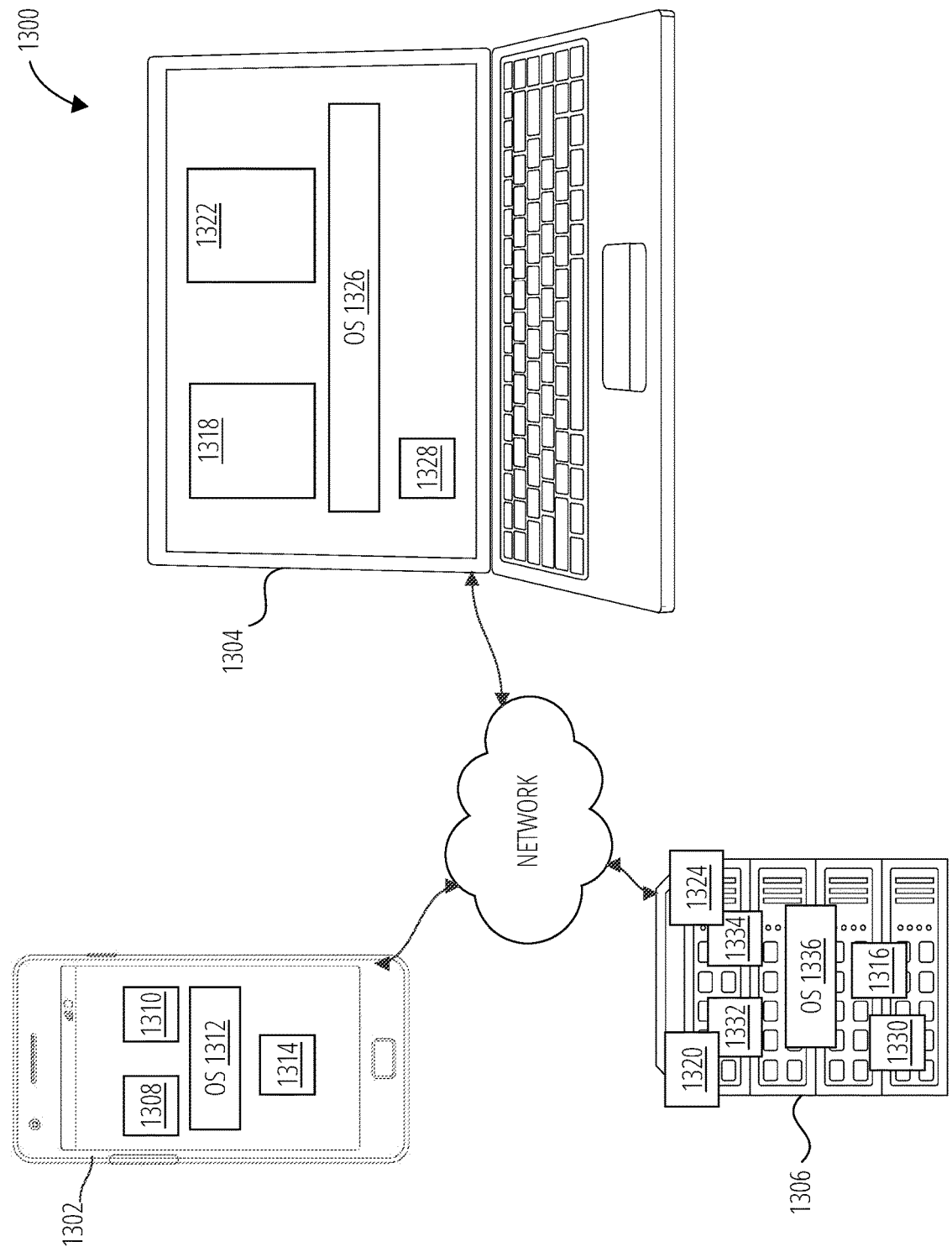
FIG. 13 depicts logic components 1300 that may be utilized in various embodiments.

FIG. 13 depicts logic components 1300 in the form of modules that may implement aspects of the described systems and techniques, in one embodiment. "Module" refers to a logic component having defined entry and exit points for interfacing with other logic components. Examples of modules are any software comprising an application program interface, drivers, libraries, functions, and subroutines. "Driver" refers to low-level logic, typically software, that controls components of a device. Drivers often control the interface between an operating system or application and hardware components and peripherals of a device, for example. "Application" refers to any software that is executed on a device above a level of the operating system. An application will typically be loaded by the operating system for execution and will make calls to the operating system for lower-level services. An application often has a user interface but this is not always the case. Therefore, the term 'application' includes background processes that execute at a higher level than the operating system. The actual distribution or use of particular logic components is very flexible and the depiction is only one example. "Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system to function in most cases, not vice-versa. The operating system also typically intermediates between applications and drivers. Drivers are said to execute "below" the operating system because they intermediate between the operating system and hardware components or peripheral devices. "Application program interface" refers to instructions implementing entry points and return values of a module. "Software" refers to logic implemented as instructions to a programmable device or component of a device (e.g., a programmable processor, controller). Software can be source code, object code, executable code, or machine code. Unless otherwise indicated by context, 'software' shall be understood to mean the embodiment of said code in a machine memory or hardware component, including "firmware" and micro-code. "Programmable device" refers to any logic (including hardware and software logic) who's operational behavior is configurable with instructions. "Instructions" refers to symbols representing commands for execution by a device using a processor, microprocessor, controller, interpreter, or other programmable logic. Broadly, 'instructions' can mean source code, object code, and executable code. 'Instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device. "Interpreter" refers to logic that directly executes instructions written in a source code language, without requiring the instructions to a priori be compiled into machine language. An interpreter translates the instructions into another form, for example into machine language, or into calls to internal modules of the interpreter or operating system, for example.

The user devices 106 utilized as originators and targets of media content may for example be a mobile programmable device 1302 or a computer 1304 such as a laptop or desktop computer, gaming console, or set-top box. A server 1306 will often intermediate between the user devices 106, examples being an online gaming server or teleconferencing server. The mobile programmable device 1302, computer 1304, and server 1306 are examples of programmable devices.

When the user device is a mobile programmable device 1302, it may include software for communicating real-time media content in the form of a teleconferencing app 1308 (e.g., Facetime, Skype) or a gaming app 1310 (e.g., Fortnight). These apps typically execute under control of an operating system 1312 (e.g., iOS, Android) and utilize one or more driver 1314 to send and receive packet-based real-time media content.

When the user device is a computer 1304, it may likewise include one or more teleconferencing application 1318 or gaming application 1322, each executing under control of an operating system 1326 that utilized one or more driver 1328 to send and receive packet-based real-time media content.

The depicted server 1306 includes a service 1332 and an application 1334, either or both of which may be utilized to implement aspects of the algorithms and tasks disclosed herein. "Task" refers to one or more operations that a process performs. "Algorithm" refers to any set of instructions configured to cause a machine or machines to carry out a particular action or process. For example, a network routing control may be implemented at the application layer as a network routing application implemented as a service 1332 or application 1334, potentially as multiple concurrent processes. Likewise the network mapping functionality may be implemented by one of these approaches and may generate or utilize one or more file 1330 (e.g., database) to store the network operational history 1102, model 1106, and internal mapping data. For additional dynamic adaptability, either or both of the service 1332 and application 1334 may utilize a plug-in 1320, dynamically-loaded library, application program interface, or an interpreter 1324 to dynamically extend their capabilities. "Library" refers to a collection of modules organized such that the functionality of all the modules may be included for use by software using references to the library in source code. In some implementations the operating system 1336 and one or more driver 1316 may be purpose-built or include features to implement aspects of the network routing control at the networking layer.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method comprising:
   receiving a connection request for communicating media content from a source media device operating in a Unicast network;
   relaying the connection request to a target media device through a first server;
   receiving a first response to the connection request from the target media device through a second server, wherein the first server and the second server are associated with a same Internet Protocol (IP) address in an Anycast network;
   the second server generating a triggering event in response to receiving the first response;
   the second server generating a request to a network routing control in the Unicast network to respond to the triggering event; and
   the network routing control reconfiguring a network route for the media content such that the second server acts as a relay for the media content.

2. The method of claim 1, wherein the network routing control comprises network mapping functionality.

3. The method of claim 1, wherein the first response is a Synchronize Sequence Number Acknowledgment (SYN-ACK).

4. The method of claim 1, wherein the media content is routed via a network routing application in the Unicast network to the target media device, and a response to the triggering event by the network routing control is at least one of:
   changing an internal mapping of a networking layer between a location of the first server and the second server;
   changing the network routing application that is routing the media content; and
   instructing the network routing application to relay the media content through a different server.

5. The method of claim 1, wherein the target media device interfaces to the IP Anycast network via the IP Unicast network.

6. A Unicast network system controller comprising:
   a processor; and
   a memory configured with instructions that when executed by the processor, cause the network system controller to:
      relay a connection request for communicating media content from an upstream media source located in a Unicast network to a target media destination through a first server, located in an Anycast network;
      receive a request from a second server in the Anycast network indicating that the target media destination responded with a first response to the connection request through the second server, wherein the first server and the second server are associated with a same Internet Protocol (IP) address in the Anycast network;
      the network routing control configuring the Unicast network to utilize the second server as a relay for the media content.

7. The network system controller of claim 6, the network routing control comprising a network routing application.

8. The network system controller of claim 7, the network routing application implemented as a service.

9. The network system controller of claim 6, wherein configuring the second server as the relay for the media content comprises an exchange of server state information confined by a configured geographical distance limit.

10. The network system controller of claim 6, further comprising network mapping functionality.

11. The network system controller of claim 10, the network mapping functionality configured to generate a network model using a machine learning system coupled to a real-time packet stream.

\* \* \* \* \*